United States Patent Office 2,835,395
Patented May 20, 1958

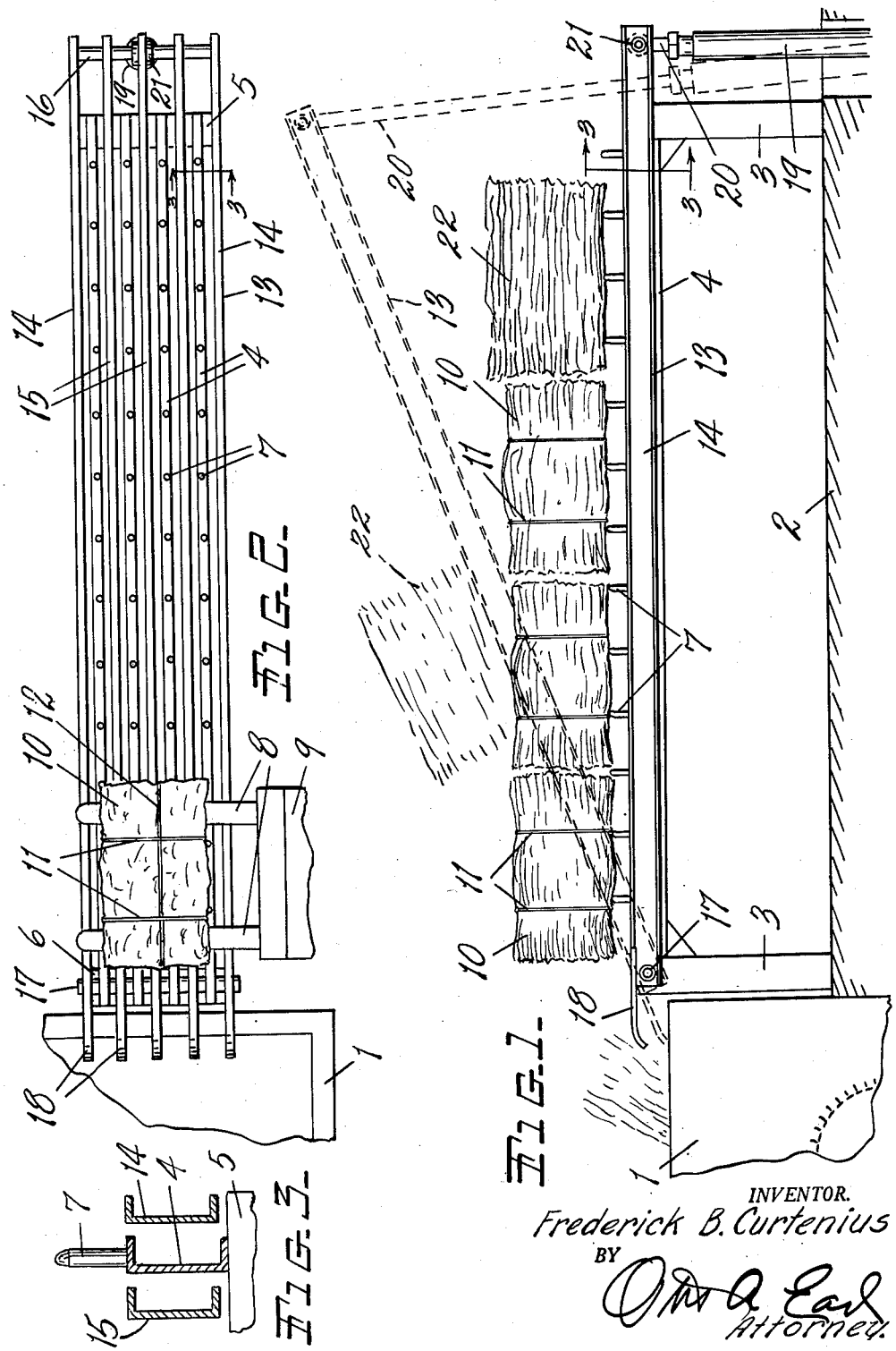

2,835,395

BALE HANDLING APPARATUS

Frederick B. Curtenius, Kalamazoo, Mich.

Application January 7, 1957, Serial No. 632,726

7 Claims. (Cl. 214—130)

This invention relates to a bale handling apparatus which is particularly designed to support the bale so that the tie wires may be readily withdrawn and the freed material discharged into a pulping machine or the like.

The main objects of this invention are:

First, to provide a bale handling apparatus which greatly reduces the manual labor in handling bales of pulp or like material facilitating the removal of the binding or tie wires and delivers the bales to an apparatus, for example, a pulping machine.

Second, to provide an apparatus having these advantages which is of large capacity and at the same time quite compact in that it occupies relatively small amount of floor space.

Objects relating to details and economies of the invention will appear from the description to follow. The invention is defined and pointed out in the claims.

A preferred embodiment of the invention is illustrated in the accompanying drawing, in which:

Fig. 1 is a side elevational view of a bale handling apparatus embodying my invention shown in operative relation to a pulping apparatus, which is conventionally shown, the chute element being shown in full lines in retracted position and in discharging position by dotted lines; the bales being conventionally illustrated, one bale being illustrated with the tie wires removed.

Fig. 2 is a plan view with a chute in retracted position. a single bale being illustrated as positioned on the apparatus by a lifting truck, a fragment of which is conventionally illustrated.

Fig. 3 is an enlarged fragmentary view on a line corresponding to line 3—3 of Figs. 1 and 2.

In the accompanying drawing I have illustrated my bale handling apparatus in association with a pulping machine 1, a fragment only of which is illustrated, and this conventionally. 2 represents the floor. The bed of the apparatus is supported in elevated position relative to the floor by legs 3. The bed comprises a plurality of elongated laterally spaced bars 4 fixedly mounted on end pieces 5 and 6. These bars are desirably of substantial width and each provided with longitudinally spaced upwardly projecting stud like bale supports 7.

These bale supports are transversely aligned and spaced to receive the forks 8 of a lifting truck 9 between them to facilitate placing of wire bound bales 10 thereon with the bales supported by these supports 7, as illustrated in Figs. 1 and 2.

The bales of pulp or the like are conventionally illustrated and are provided with binding or tie wires 11 and 12 although quite commonly the longitudinally disposed wires 12 are not used.

The chute designated by the numeral 13 comprises the side rails 14 and intermediate bars 15. These bars and rails are connected at their swinging ends by the cross bar 16 and at their opposite ends by the pivot rod 17 which is disposed through the base bars adjacent the rear end of the bed. The side rails, when the chute is collapsed, are positioned at the outer sides of the bed bars, the side rails and intermediate chute bars are spaced to secure the bed bars between them and when in collapsed or retracted position the upper surface of the chute is desirably approximately in the plane of the upper edges of the bed bars. When collapsed or retracted the side rails and intermediate bars of the chute rest upon the cross piece 5 of the bed.

The chute is provided with extensions 18 having downturned ends which overhang the tank of the pulping apparatus. The chute is actuated to discharging position by the hydraulic means, the cylinder 19 of which is shown conventionally. This cylinder is swingably supported, the plunger rod 20 being pivotally connected at 21 to the swinging end of the chute.

In use the chute is positioned in its retracted position and the bales placed thereon in supported relation to the bale supports 7. The baling wires are then cut and may be readily withdrawn leaving the unbound bales on the supports as indicated at 22 in Fig. 1.

It will be understood that these bales of pulp and the like are of considerable weight and it is difficult to withdraw the cut baling wires when the bales are resting on a flat supporting surface but with the bales supported as by the supports 7 the cut ties are easily withdrawn. In fact, when cut they will usually fall away from the bales. After the ties are cut the bales slide therefrom into the pulping apparatus or other apparatus as may be desired. The bales may be readily positioned by means of lifting trucks as the supports are spaced so that the forks of the trucks may enter between them, as is illustrated. The bed is desirably positioned about waist high for further convenience and to lessen the labor of the workmen.

I have not illustrated means for controlling the hydraulic actuating means as the details form no part of this invention and the chute might be operated by a hoist or means positioned overhead. The embodiment of my invention illustrated is highly practical and greatly reduces labor and floor space in the handling of the bales and the discharging thereof into the pulping machine.

I have not attempted to illustrate or describe other embodiments or adaptations which I contemplate as it is believed this disclosure will enable those skilled in the art to embody or adapt the invention as may be desired.

Having thus described the invention what I claim as new and desire to secure by Letters Patent is:

1. In a bale handling apparatus, the combination of a bed comprising a plurality of elongated laterally spaced bars provided with longitudinally spaced series of upwardly projecting stud-like bale supports, the bale supports being transversely aligned and spaced to receive the forks of a lifting truck between them, a chute pivotally mounted on said bed at one end thereof and comprising side rails and a plurality of laterally spaced longitudinal bars between said side rails, said longitudinal bars being spaced to lie between the bars of the bed when the chute is in retracted position with the side rails thereof at the outer sides of the bed, said chute side rails and longitudinal bars being below the plane of the upper ends of said bale support when the chute is in retracted position, and means for raising and lowering said chute on its pivotal mounting, said chute when raised clearing said bale supports so that bales on the chute may slide therefrom without engagement with said bale supports, said chute bars being provided with discharge extensions projecting beyond the end of the bed on which the chute is pivoted.

2. In a bale handling apparatus, the combination of a bed comprising a plurality of elongated laterally spaced bars provided with longitudinally spaced series of upwardly projecting stud-like bale supports, the bale supports being transversely aligned and spaced to receive the forks of a lifting truck between them, a chute pivotally mounted on said bed at one end thereof and comprising a plurality of laterally spaced longitudinal bars spaced to lie between the bars of the bed when the chute is in retracted position, said longitudinal bars being below the plane of the upper ends of said bale supports when the chute is in retracted position, and means for raising and lowering said chute on its pivotal mounting, said chute when raised clearing said bale supports so that bales on the chute may slide therefrom without engagement with said bale supports.

3. In combination, an elongated bed comprising a plurality of elongated laterally spaced bars provided with longitudinally spaced series of upwardly projecting work supports, the work supports being transversely aligned and spaced to receive a work positioning element between them, a chute pivotally supported at one end of said bed for vertical swinging adjustment and comprising side rails and a plurality of laterally spaced longitudinal bars disposed between said side rails and spaced to lie between the bars of the bed when the chute is in retracted position with the side rails thereof at the outer sides of the bed, said chute side rails and intermediate bars being below the plane of the upper ends of said work supports when the chute is in retracted position, and means for raising and lowering said chute on its pivotal mounting to work support clearing position so that work on the chute may slide therefrom without engagement with said work supports.

4. In combination, an elongated bed comprising a plurality of elongated laterally spaced bars provided with longitudinally spaced series of upwardly projecting work supports, the work supports being transversely aligned and spaced to receive a work positioning element between them, a chute pivotally supported at one end of said bed for vertical swinging adjustment and comprising a plurality of laterally spaced longitudinal bars spaced to lie between the bars of the bed when the chute is in retracted position and below the plane of the upper ends of said work supports when the chute is in retracted position, and means for raising and lowering said chute on its pivotal mounting to work support clearing position so that work on the chute may slide therefrom without engagement with said work supports.

5. An apparatus of the class described comprising a bed having a plurality of laterally spaced rows of work support members projecting upwardly therefrom, the work supports of the rows being transversely aligned and spaced in the rows to receive the forks of a lifting truck between them, a chute tiltably supported at one end of the bed and comprising side rails and intermediate bars, the intermediate bars being spaced to lie between the work support members and below the plane of the upper ends thereof when the chute is in retracted position, the side rails of the chute being positioned at the sides of the bed when the chute is in retracted position, and means for raising and lowering the chute, said chute in raised position clearing the work supports so that the work thereon may discharge therefrom without engagement with said work supports.

6. An apparatus of the class described comprising a bed having a plurality of laterally spaced rows of work support members projecting upwardly therefrom, the work supports of the rows being transversely aligned and spaced in the rows to receive the forks of a lifting truck between them, a chute tiltably supported on one end of the bed and comprising bars spaced to lie between the rows of work support members and below the plane of the upper ends thereof when the chute is in retracted position and lift the work from said work supports when the chute is in raised discharging position.

7. An apparatus of the class described comprising a bed having a plurality of laterally spaced rows of work support members projecting upwardly therefrom, the work supports in each of the rows being transversely aligned and spaced in the rows to receive the forks of a lift truck between them and transversely of the rows, a chute tiltably supported at one end of the bed and comprising a slide surface having openings therein through which said work support members project, means supporting said chute with said slide surface sufficiently below the tops of said work support members to permit the entrance of said forks between said support members and above said slide surface when the chute is in retracted lowered position, and means for raising and lowering the free end of the chute, said chute in raised position clearing the work supports so that work will slide off of the chute.

References Cited in the file of this patent

UNITED STATES PATENTS 2,597,246     Kelly _____ May 20, 1952